Dec. 6, 1938.   C. BITTNER   2,139,253
ADJUSTABLE SEAT
Original Filed March 23, 1935   3 Sheets-Sheet 1
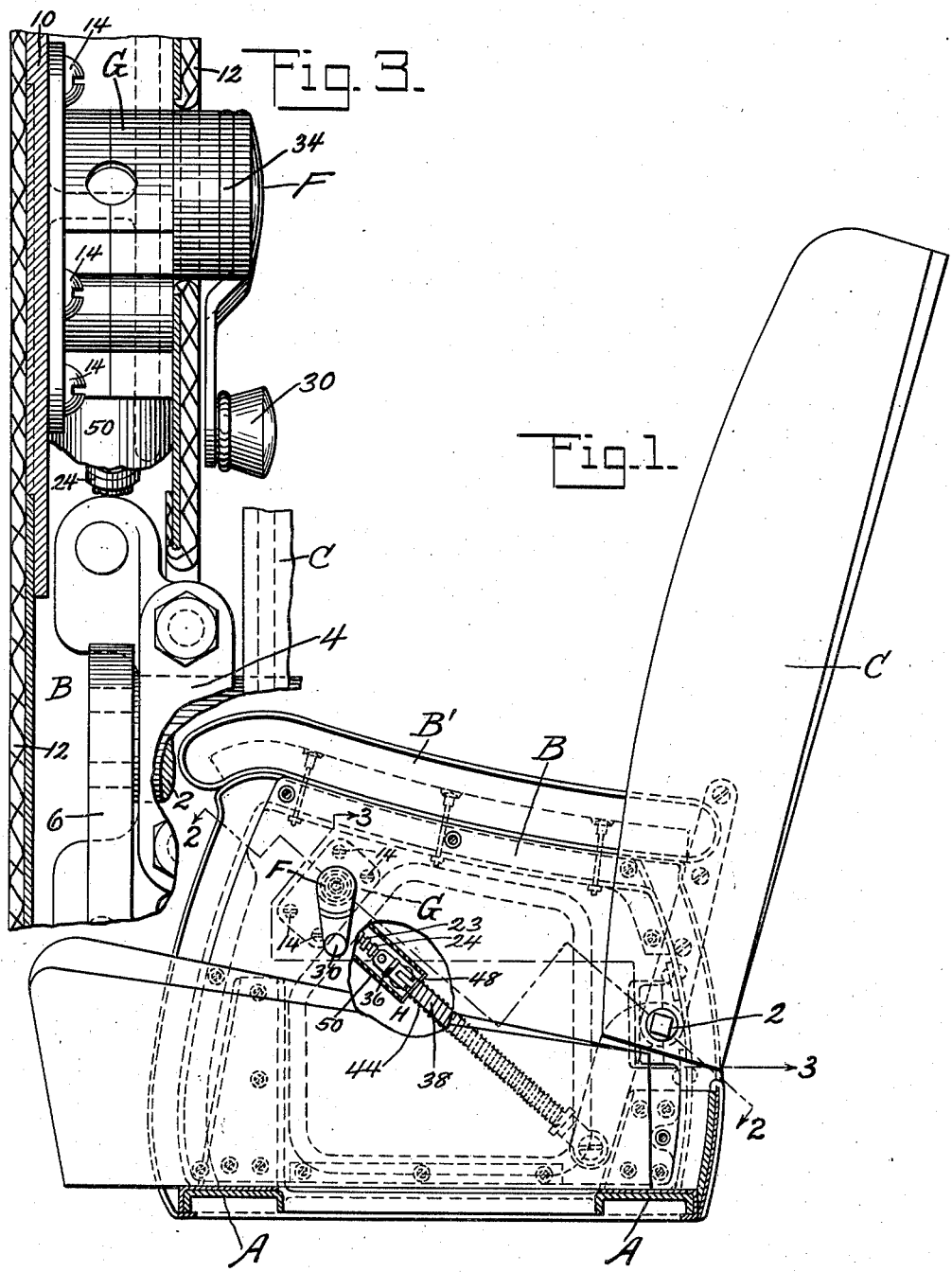
INVENTOR
Clifford Bittner
BY
ATTORNEY

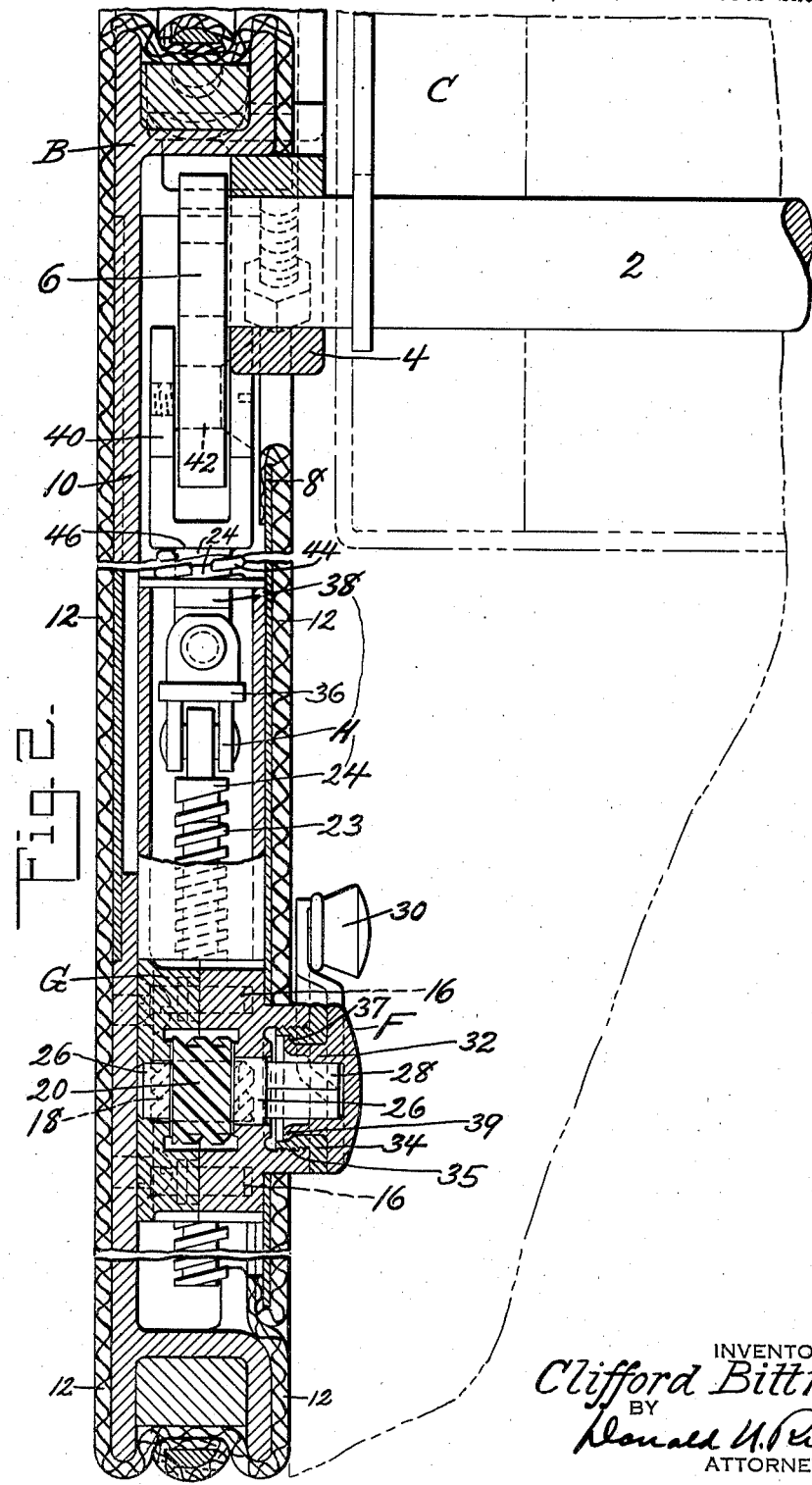

Dec. 6, 1938.  C. BITTNER  2,139,253
ADJUSTABLE SEAT
Original Filed March 23, 1935   3 Sheets-Sheet 3
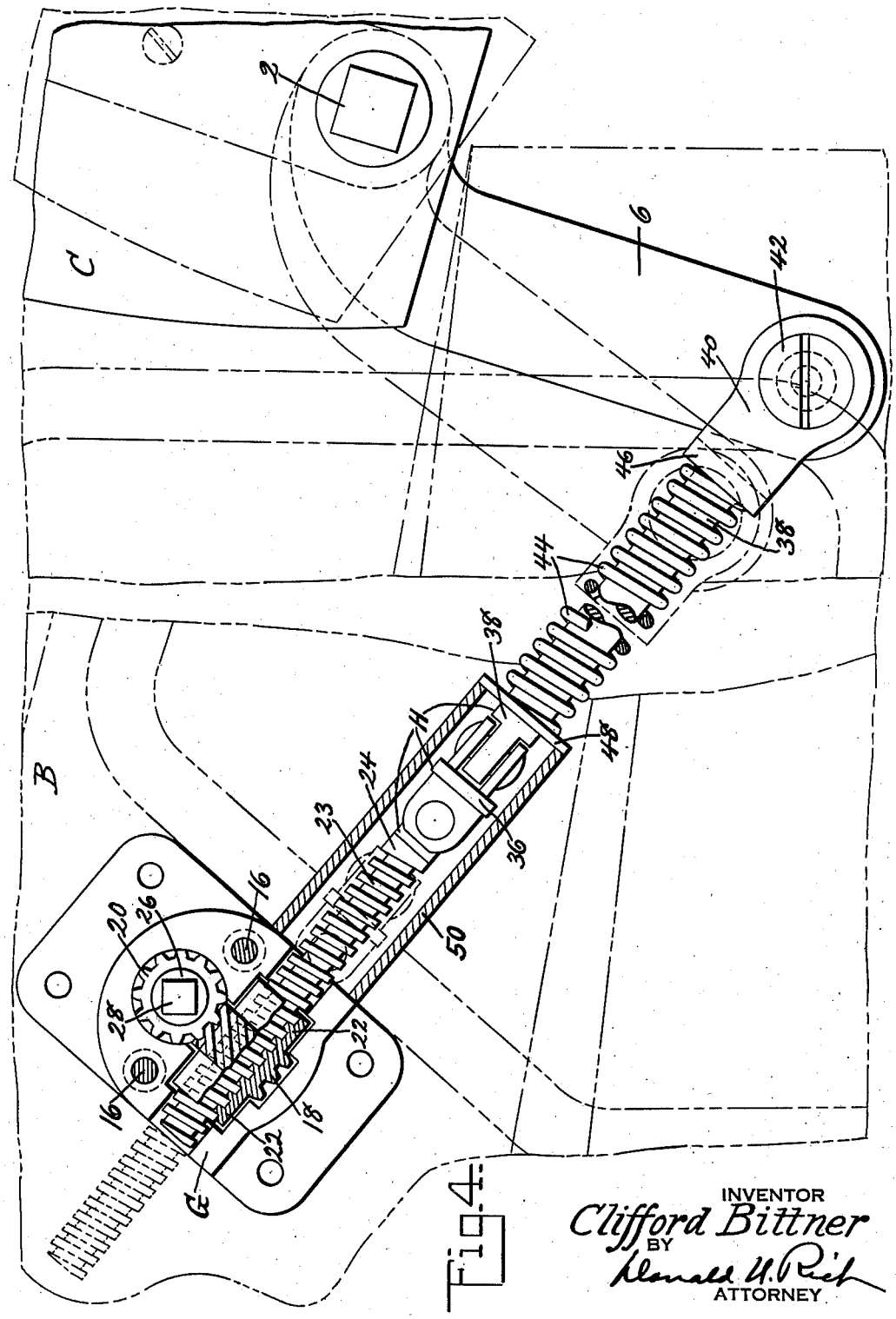
INVENTOR
Clifford Bittner
BY
ATTORNEY Patented Dec. 6, 1938

2,139,253

UNITED STATES PATENT OFFICE 2,139,253

ADJUSTABLE SEAT

Clifford Bittner, Berwick, Pa., assignor to American Car and Foundry Company, New York, N. Y., a corporation of New Jersey Refiled for abandoned application Serial No. 12,559, March 23, 1935. This application September 24, 1936, Serial No. 102,317

1 Claim. (Cl. 155—161)

This invention relates generally to car seats and has particular reference to seats adapted primarily for use in railway pasenger cars or buses. This application is a substitute for application filed March 23, 1935, Serial No. 12,559, which was abandoned July 30, 1936.

One object of the present invention is to provide a car seat in which the angular position of the back thereof may be adjusted to substantially an infinite number of positions.

Seats having reclining or adjustable backs have been in use for many years. Railway car seats have been provided with adjustable backs and means for adjusting the positioning of the back. In providing a car seat with an adjustable back it is necessary to utilize a seat back operating mechanism which is arranged in an easily accessible position and the normal position for such a mechanism is adjacent the arm rest of the seat. The adjusting mechanisms of the prior art have been such that considerable play and lost motion are present so that the seat back is not rigid or stable in its adjusted position, but has a tendency to vibrate during motion of the vehicle. It is, therefore, another object of this invention to provide a car seat with an adjustable back, and means for adjusting the position of the back which is so formed and arranged that the back is restrained against vibration during motion of the vehicle and at other times, and this object is accomplished by the specific arrangement of parts shown in the drawings and hereinafter fully described.

Still another object of this invention is the provision of a seat back controlling mechanism which will permit an infinite number of adjusted angular positions of the seat back.

A further object of this invention is the provision of a seat back controlling mechanism which will be self-locking in any adjusted position.

Other objects and advantages of this invention will be apparent from the following description taken in conjunction with the accompanying drawings, in which:

Figure 1 is a side elevational view of the seat, certain parts being broken away and other parts being shown in section;

Fig. 2 is an enlarged sectional view on the line 2—2, Fig. 1;

Fig. 3 is an enlarged sectional view taken on the line 3—3, Fig. 1, and

Fig. 4 is an enlarged elevational view, partly in section, of the seat back adjusting mechanism, the latter being shown in full lines at one position and in broken lines in a second position.

Referring now more in detail to the drawings, it can be seen that the seat frame is of more or less conventional form and comprises a base frame A, rigidly attached side portions B, and a back C pivotally connected to the side portions B. The seat is provided with arms B' secured to the side portions B by suitable fasteners such as bolts or the like.

The back C is rigidly and non-rotatably fastened to a pivot rod 2 supported in bearings 4 secured to the side portions B, as clearly shown in Fig. 2. The pivot rod 2 has one end portion thereof projecting beyond its associated bearing 4 and has secured thereto and depending therefrom a control arm 6. As clearly shown in Fig. 2, control arm 6 is arranged between the inner plate 8 and the outer plate 10 of the corresponding side portion B and said plates are preferably covered by upholstery 12. As can be seen in Fig. 1, the lower end portion of the control arm is arranged closely adjacent the base frame A.

A gear box is indicated at G and the same is fastened to the inner surface of the outer side frame member 10 by suitable fasteners 14 and is formed in two parts connected together by fasteners 16 (see Fig. 2) and said gear box is so formed that space is provided to accommodate a worm 18 and a worm gear 20.

As shown more clearly in Fig. 4, the worm 18 comprises an internally threaded tubular member having extensions 22 beyond the threads of the worm to provide bearings for the latter while the internal threads are arranged in meshing relation with the external thread 23 of a rod 24 forming one portion of an actuating element H. As clearly shown in Fig. 4, the rod 24 extends through suitable openings in the gear box G. The worm 18 is in constant meshing relation with the worm gear 20, which latter is carried on bearings 26 formed in the gear box, and said gear 20 is provided with a squared end extension 28 which receives an operating crank assembly indicated generally at F and provided with a handle 30. As shown clearly in Fig. 2, the handle 30 is provided with a central extension 32 having a squared internal socket which fits over the end portion 28 of the worm gear. An externally threaded nut 34 fits around the extension 32 and threadedly engages the gear box, as shown at 35. The nut 34 is provided with a shoulder 37 which constitutes a keeper for preventing removal of the handle 30, the latter, more particularly the upper portion 32 thereof, being provided with an outwardly directed flange 39 which engages said keeper; all as clearly shown in Fig. 2.

The rod 24 is connected by means of a universal joint 36 to a rod 38 (see Fig. 4), the lower end of which is preferably bifurcated as at 40 (see Fig. 2) and is pivotally connected to the lower end portion of control arm 6 by suitable fastener such as screw 42. Surrounding the rod 38 is a spring 44 which, at the lower end portion thereof, bears against the shoulder 46 forming the head of the bifurcated end portion of the rod 38, and its opposite, or upper end, bears against a washer or spring seat 48 which, in turn, is seated against the lower end of a tube 50 which surrounds and encloses the rod 24 and the universal joint 36. The tube 50 may or may not be secured to the gear housing G, and the spring 44 is preferably applied under compression when the back C is in its extreme upright position.

It is to be noted that the assembly comprising the rods 24 and 38 inclines upwardly from the lower end portion of the control arm 6 so that the operating mechanism is convenient for an operator. It is to be further noted that the connection of the rod 38 with the control arm is at a fixed point, but said connection is a pivot.

From the above description it can be seen that upon rotation of the handle 30 the worm gear 20 operates worm 18. Rotation of worm 18 causes movement of the rod 24 with its universally connected rod 38 and consequently a shifting of the control arm to adjust the seat to any desired position. Preferably the threads of gears 20 and 18 are formed in such a manner and of such pitch as to be self-locking or, in other words, non-reversible unless the handle 30 is positively operated. In view of this the seat back is held and positively retained in an infinite number of positions and the compressive force of the spring 44 will prevent rattling and vibration of the parts.

The drawings illustrate one embodiment of the invention but it is understood that they are for illustrative purposes only and various changes in the form and proportions of the construction may be made within the scope of the appended claim without departing from the spirit of the invention.

What is claimed is:

In a seat, a base frame having side portions, a back pivotally connected to the side portions for movement relative thereto, a control arm fixed to said back and depending therefrom, and means for shifting said back on its pivot including a tubular worm having an elongated internally threaded hub portion, a worm gear, a casing enclosing said worm and worm gear and having bearings retaining the worm and worm gear in normal mesh, certain of the walls of said casing confining said worm against longitudinal movement and being formed with alined openings, a threaded rod traveling through said aligned openings and normally meshing with the internal threads of said hub, a rod pivoted to said arm, a universal connection between said threaded rod and pivoted rod, an elongated shell enclosing said universal connection and that portion of said threaded rod between the casing and universal connection, a spring seat member on the pivoted rod arranged to bear against the free end of the shell, and a spring on said pivoted rod bearing against said spring seat for retaining said shell against said casing.

CLIFFORD BITTNER.